United States Patent [19]

Wilson et al.

[11] 3,900,461
[45] Aug. 19, 1975

[54] LYMPHOCYTE STROMA ADSORBENT
[75] Inventors: Billie J. Wilson; Arthur Malley, both of Beaverton, Oreg.
[73] Assignee: The United States of America as represented by the Secretary of Health, Education and Welfare, Washington, D.C.
[22] Filed: Sept. 22, 1972
[21] Appl. No.: 291,347

Related U.S. Application Data
[63] Continuation-in-part of Ser. No. 228,308, Feb. 22, 1972, abandoned.

[52] U.S. Cl............ 260/209 D; 195/1.8; 260/112 R; 424/85
[51] Int. Cl............................................ C08b 19/08
[58] Field of Search................................ 260/209 D

[56] References Cited
UNITED STATES PATENTS
3,105,012   9/1963   Brandon et al................ 260/209 D Primary Examiner—Johnnie R. Brown

[57] ABSTRACT

A method of purifying antibodies against lymphocytes which consists of adsorbing and eluting purified antibody from an immunoadsorbent consisting of lymphocyte stroma conjugated to a cyanogen bromide activated cross-linked dextran polymer. The antibody is selected from a heterologous serum ALS, ATS, ALG, and ATG and the purified antibody product has significant immuno-suppressive properties for prolonging graft survival while retaining humoral and cellular immunity to other foreign materials in the recipient. Further, the immunoadsorbent material provides a one-step preparative procedure. The immunoadsorbent has been found to be reusable for a period greater than 2 years.

1 Claim, No Drawings

LYMPHOCYTE STROMA ADSORBENT

This application is a continuation-in-part of Ser. No. 228,308 filed Feb. 22, 1972, in the names of Arthur Malley and Billie J. Wilson, entitled "Lymphocyte Stroma Absorbent," and now abandoned.

The present invention comprises a chemical conjugation of lymphocyte stroma to an insoluble cross-liked dextran carrier which allows one-step isolation of specific antilymphocyte antibody which is immunosuppressive in the species from which the lymphocytes orignate. Generally, antilymphocyte serum is added to the lymphocyte stroma adsorbent and the antibody molecules bind to the stroma particles. The serum components which do not bind are removed in a buffer wash of the absorbent, and only the specific or purified antibody is bound to the stroma conjugate. The specific or purified antibody is eluted from the absorbent at low pH which dissociates antigen-antibody bonds. Then the specifically purified antibody is dialyzed, concentrated, and used to suppress tissue homograft rejection in animals of the species that provided the lymphocytes used to prepare the lymphocyte-stroma adsorbent. Another term for such serum is heterologous antilymphocyte serum. Although the specifically purified antibody suppresses graft rejection, the treated recipient retains the ability to express humoral and cellular immune reactions to other foreign materials.

Upon washing the lymphocyte-stroma adsorbent with buffer, it is ready to be used again to isolate another batch of specific antibody. Such lymphocyte-stroma adsorbents have been used repeatedly for periods greater than 2.5 years without any significant decrease in their efficiency in isolating and purifying immunosuppressive antibodies.

IN VIVO UTILIZATION

A unique immunoadsorbent is utilized to isolate antilymphocyte anitbodies from antilymphocyte sera which are immunosuppressive in the species from which the lymphocytes came. This antilymphocyte sera is prepared by injecting the lymphocytes from one species into members of another species. The sera thus prepared is immunosuppressive in the species from which the lymphocytes came. Antilymphocyte serum has been used as an immunosuppressive agent in many species (man, monkey, mouse, rat, dog, guinea pig, etc.). The sera is a good immunosuppressive agent but many treatment side effects are encountered due to the large amount of protein which must be administered to achieve immunosuppression. The antibody directed against the lymphocytes is about 1–5% of the total serum protein. The present stroma adsorbent allows the selective spearation of those antibodies which bind to stroma from the whole sera. Thus the specifically purified antilymphocyte antibody eluted from the adsorbent is very effective as an immunosuppressive agent in preventing graft rejection in the species from which the lymphocytes originated. As the lymphocyte-stroma adsorbent permits a significant enrichment from whole sera of the immunosuppressive antibodies, only a small quantity of protein is needed to achieve immunosuppression, and therefore secondary complications or side effects are avoided.

The stroma adsorbent itself is rewashed with buffer ater elution of the antibody and as soon as the pH reaches neutrality (pH 7), the adsorbent can be reused in the same manner.

The literature recently is amply supplied with references tangential to the present development; e.g., 1. B. J. Wilson, et al, "Isolation of Rabbit Antirhesus Lymphocyte Antibody Using a Specific Immunoadsorbent," J. Immun., 106 (February, 1971), pages 402–406.
2. B. J. Wilson, et al, "Immunosuppressive Properties of Antilymphocyte Antibody Isolated from a Specific Immunoadsorbent," Transplantation, 13 (February, 1972), pages 189–192.
3. L. Wide and J. Porath, Biochim. Biophys. Acta, 130 (1966), pages 257–260. Here anti-human choronic gonadotropin (an antibody) was conjugated to a dextran (Sephadex) by an isothiocyanate linkage. The utilization was, however, to isolate a protein (an antigen) rather than to purify an antibody. This appears equivalent to U.S. Pat. NO. 3,555,143 Axen at column 4.
4. Sereafico, "Transplantation," 10 (1970), page 227. Whole thymocytes were utilized to adsorb the antibody and afterwards to elute, and cells were not reusable.
5. R. Bachvaroff, et al, J. Immun., 103 (1959), page 553. Here stroma was used for adsorption but was not reusable, and the same is true of the following reference, which is:
6. E. M. Lance, J.E.M., 130 (1959), page 49, where the adsorption is made with stroma alone and the stroma here was not reusable.

PREPARATION OF MATERIALS

The preparation of stroma is well known in the art and is specifically described at pages 82+ and 393 of Methods in Immunology and Immunochemistry, Williams and Chase (1967), Vol. 1, Academic Press. The specific method of preparing stroma from lymphocytes is set out below. This preparative technique involves slow hypotonic lysis of lymphocytes which yields large stroma particles. These particles are stable and retain the necessary antigenic determinants.

Stroma.

Stroma was prepared from pooled lymphocytes by slowly decreasing the ionic strength of the wash, in three equal steps. After each washing in the hypotonic solution the stroma and remaining cells were pelleted at 15,000 rpm at 0°C for 30 min. When lysis was complete, the stroma was washed 3 times in distilled water, repelleted and suspended in PBS.

CROSS-LINKED DEXTRAN

The dextran of choice for utilization in the present invention is a bead formed dextran gel which has been prepared by cross-linking dextran fractions with epichlorohydrin. Dextran itself is ana anhydroglycose polymer produced in sucrose containing solutions by different strains of *Leuconostoc mesenteroides*. Because of the high content of hydroxyl groups in the polysaccharide chains, the cross-linked dextran is strongly hydrophilic and thus swells in water. The gel formations of cross-linked dextran in bead form are conveniently manufactured under the trade name SEPHADEX with different suffix definitions according to the water regain value. Such bead form sorbents are manufactured by the Swedish pharmaceutical house Pharmacia AB, and a schedule of operable SEPHADEX varieties, together with their dry particle diameter in microns, is given below. Of particular applicability is SEPHADEX G-100.

| Sephadex type | | Dry particle diameter μ |
|---|---|---|
| Sephadex G-10 | | 40–120 |
| Sephadex G-15 | | 40–120 |
| Sephadex G-25 | Coarse | 100–300 |
| | Medium | 50–150 |
| | Fine | 20–80 |
| | Superfine | 10–40 |
| Sephadex G-50 | Coarse | 100–300 |
| | Medium | 50–150 |
| | Fine | 20–80 |
| | Superfine | 10–40 |
| Sephadex G-75 | | 40–120 |
| | Superfine | 10–40 |
| Sephadex G-100 | | 40–120 |
| | Superfine | 10–40 |
| Sephadex G-150 | | 40–120 |
| | Superfine | 10–40 |
| Sephadex G-200 | | 40–120 |
| | Superfine | 10–40 |

MODIFICATION OF THE SEPHADEX

SEPHADEX which had been prepared according to the method of Borsos and Rapp (Borsos, T. and Rapp, H. J., J. Immun., 94:510, 1965) was equilibrated in water overnight, allowed to settle, and activated with cyanogen bromide (Eastman Organic Chemicals, Rochester, N.Y.) according to Cuatrecases et al (Cautrecases, P., Wilcheck, M., and Anfinsen, C. B., Proc. Nat. Acad. SCI., 61:636, 1968).

The stroma was added to the activated Sephadex and stirred for 24 hr at 4°C. For each milliliter of activated Sephadex, the stroma obtained from $3 \times 10^8$ lymphocytes was utilized in preparing the immunoadsorbent. The conjugate was washed in a Buchner funnel with the following cold reagents: 20 volumes 1% $NaHCO_3$; 5 volumes $H_2O$; 10 volumes 0.1 glycine-HCL, pH 2.5; 10 volumes $H_2O$; and 30 volumes 0.01 M cacodylate-saline buffer, pH 6.8. The conjugate was resuspended in one volume cacodylate saline and two volumes of unreacted Sephadex G14 ɸ were added before it was poured into a 2.5- × 50-cm chromatographic column. The column was washed with buffer for at least 24 hr before addition of serum. The preparative procedure is summarized in Chart 1.

CHART 1.

Preparation of Lymphocyte Stroma Immunoadsorbent

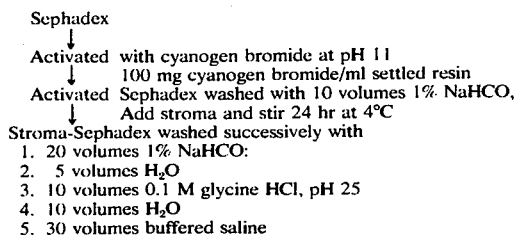

Antilymphocyte sera is applied to the specific stroma adsorbent and followed with a buffer. The specific antibody binds to the stroma adsorbent and the nonspecific serum components are removed by buffer wash. The specific antibody is then eluted with glycine HCl buffer, pH 2.5 to 3. The eluted antibody is neutralized immediately with 0.1 M NaOH. The specific antibody is then dialyzed and concentrated against phosphate buffered saline (PBS) pH 7.2. The purified antibody can then be used as an immunosuppressive agent in the species which were the source of the stroma.

The antilymphocyte sera can be produced in most mammalian species against the lymphocytes of any other mammalian species.

A specific example of the production of ALS, stroma preparation, and subsequent isolation of the antibody is given below. Rabbit anti-rhesus lymphocyte sera prepared by injecting rabbits with rhesus thymocytes were applied to a stroma adsorbent prepared from rhesus lymphocytes. The specifically purified rabbit anti-rhesus lymphocyte antibody (RARhLAB) was tested in vitro and for immunosuppressive capacity in vivo in rhesus monkeys. Sheep anti-human lymphocyte sera (SAHLS) has been prepared and the antibody (SAHLAB) purified from a human lymphocyte stroma adsorbent. The purified anti-human lymphocyte antibody was tested for in vitro activity and for toxicity and in vivo immunosuppressive activity in rhesus monkeys (a closely related species). Specific examples follow.

EXAMPLE I

Preparation of Rabbit Anti-rhesus Lymphocyte Antibody from a Rhesus Lymphocyte Stroma Adsorbent The cells used in preparing stroma for immunization, or for in vitro assay, were obtained from the thoracic duct, thymus and peripheral blood of rhesus monkeys (Macaca mulatta).

Cell separation.

Peripheral lymphocytes were separated from freshly drawn heparinized rhesus blood by adding an equal volume of 3% gelatin in saline and incubating 1 hr at 37°C. The suspended lymphocytes were drawn off, washed 3 times in saline at 37+C, counted and diluted to the proper concentration. Rhesus thymus was obtained from animals between 155 days of gestation and 2 years of age. Tissue was excised shortly after death of the animal Thymic tissue was cut into 200-mg pieces and thymus cells were pressed through a fine wire mesh and collected in cold phosphate-buffered saline (PBS–pH 7.2). The cell suspension was heparinized and filtered through cheese cloth. Thoracic duct lymphocytes were obtained by surgical cannulation (Hill, H. D., personal communication). Thoracic duct lymphocytes and filtered thymocytes were washed 3 times in saline, counted and diluted to the proper concentration.

Stroma.

The stroma was prepared as set out previously in "Preparation of Material."

Sephadex.

The Sephadex was prepared and modified as set out previously in "Modification of the Sephadex."

Serum preparation.

Rabbit anti-rhesus thymocyte serum (ATS) was prepared by immunizing each rabbit with $5 \times 10^8$ fresh or frozen thymocytes in complete Freund's adjuvant followed 4 weeks later with an intravenous injection of 5 × $10^8$ fresh thymocytes. One week later the rabbits were bled out. Rabbit anti-rhesus lymphocyte sera (ALS) were prepared over the period of a year with subcutaneous injections of $10^6$ peripheral or thoracic duct lymphocytes every 2 weeks. Both types of sera were inactivated at 56°C for 30 min and adsorbed with 1/10 volume of packed rhesus erythrocytes for 2 hr at 37°C, and then overnight at 4°C. Sera were stored at −10°C until used.

In vitro assays.

Leukagglutinins were assayed by a micromodification of the method of Abaza and Woodruff (Abaza, H. M. and Woodruff, M. F. A., Rev. Franc. Etud. Clin. Biol., 11:821, 1966).

Whole serum (ATS), antibody (ATAB), or column effluent (CP) was diluted serially in 0.025 ml phosphate-buffered saline (PBS). Thymocytes (0.05 ml of a suspension of 20 × $10^6$ cells/ml) were added to each dilution of serum in a microtiter plate (Cooke Engineering, Alexandria, Va.) and incubated 1 hr at 37°C. Portions were removed from each well and read microscopically. Goat anti-human lymphocyte globulin, prepared by ammonium sulfate precipitation, was provided by Dr. B. Pirofsky, University of Oregon Medical School Cytotoxicity and leukagglutinin (Supra, Abaza et al.) assays on the original globulin and antibody fraction were performed in Dr. Pirofsky's laboratory. Recovery of antilymphocyte antibody activity from the immunoadsorbent was also assayed by transformation of rhesus peripheral lymphocytes (Mackler, B. F., Malley, A. and Amkraut, A. A., Fed. Proc., 27:564, 1968).

The original seruml purified antibody (ATAB) and the column passage fraction (CP) were used as mitogens. Gelatin-separated peripheral lymphocytes (2 × $10^6$/ml) and mitogen (1 to 10 mg IgG/tube) were cultured in roller tubes at 37°C for 48 hr before the addition of 2 $\mu$Ci of tritiated thymidine. Twelve hours later the cells were harvested and the level of transformation was measured as counts/min of incorporated tritiated thymidine in trichloracetic acid (TCA)-precipitable material by liquid scintillation (Packard automatic liquid scintillation counter).

ATS, ATAB and CP were examined by analytic ultracentrifugation at 50,740 rpm at 20°C. Photographs were taken at 15, 30, 45 and 60 min after the centrifuge reached maximum speed. Sedimentation coefficients were calculated and the concentration of protein in the 7S peak was determined by planimetry from the 60-min frames. Specific activities were calculated by dividing the reciprocol of the leukagglutinin titer by the milligrams of IgG or milligrams of protein/milliliter of assayed material.

Results

ATS (25 ml) was washed through the specific immunoadsorbent column (2.5 × 50 cm) with 0.01 M cacodylate saline buffer, pH 6.8. Effluent was monitored at 254 nm and fractions were collected at 20-min intervals. Buffer wash was continued until all the nonspecific material was eluted from the column. The adsorbed antibody was eluted with 0.1 M glycine-HCl, pH 2.5. A typical elution pattern is illustrated in FIG. 2. The column passage (CP), peaks I, II and III, was pooled as fraction I and peak IV, which contained the specific antibody, was pooled as fraction II. The arrow indicates where elution with 0.1 M glycine-HCl was begun. Both fraction I (CP) and fraction II (ATAB) were concentrated and dialyzed against phosphate-buffered saline (PBS) by negative pressure dialysis. Various amounts of normal rabbit serum (NRS) were applied to the immunoadsorbent to evaluate the degree of nonspecific binding of proteins. Less than 5% of the NRS added was bound to the immunoadsorbent and eluted with 0.1 M glycine-HCl, pH 2.5.

The percentage recovery of total protein and IgG of the two fractions (ATAB, CP) from three separate experiments are shown in Table I

TABLE I

Recovery of total protein IgG in fractions eluted from the specific immunoadsorbent

|  |  | Serum[2] Applied | ATB[6] | | CP[c] | | Total |
|---|---|---|---|---|---|---|---|
|  |  | mg | mg | % | mg | % | % |
| Expt. A | Total protein | 1484 | 87 | 6 | 1364 | 92 | 08 |
|  | IgG | 435 | 80 | 18 | 269 | 62 | 80 |
| Expt. B | Total protein | 1946 | 179 | 9 | 2085 | 108 | 116 |
|  | IgG | 638 | 166 | 26 | 460 | 72 | 98 |
| Expt. C | Total protein | 1484 | 120 | 8 | 1357 | 91 | 99 |
|  | IgG | 435 | 103 | 23 | 264 | 60 | 84 |

*Concentration based upon planimetry (see text)
*Antibody fraction eluted with 0.1 M glycine HCl, pH 2.5.
* Pooled peaks I, II and III eluted with initial buffer (cacodylate saline, pH 6.8).

The left hand side of the table indicates the milligrams of IgG and total protein present in ATS applied to the immunoadsorbent; the right hand side indicates the recovery of IgG and protein obtained in both fractions. This procedure provided almost complete recovery of total protein. In experiment B, more than 100% recovery was calculated, indicating a margin of error in this method of calculations based upon planimetry of ±15%. The antibody fraction contained 18 to 26% of the total IgG and 6 to 9% of the total protein applied. The results of the three separate experiments demonstrate the reproducibility of this method.

The specific activities of both fractions from the immunoadsorbent column are recorded in Table II in terms of leukagglutinin activity (LA) (reciprocol of LA titers/milligram of IgG).

TABLE II

Recovery of specific cavity of isolated fractions from the immunoadsorbent

|  | Fraction[1] | LA | Protein | LA/Mg Protein | IgG | LA/Mg IgG |
|---|---|---|---|---|---|---|
|  |  |  | mg/ml | mg/ml |  |  |
| Expt.A | ATAB | 3072 | 17.45 | 173 | 15.90 | 191 |
|  | CP | 384 | 100.0 | 2.4 | 32.00 | 12 |
| Expt.B | ATAB | 1536 | 35.78 | 42.5 | 33.12 | 46.3 |
|  | CP | 192 | 100 | 1.01 | 41.08 | 4.6 |
| Expt.C | ATAB | 3072 | 23.96 | 128 | 30.66 | 149.0 |
|  | CP | 384 | 90.48 | 4.0 | 17.6 | 22.0 |

[1] Specific activity (LA/mg) of ATS based upon milligrams of protein was 8 and milligrams of IgG was 26.

The experiments reported here are the same three reported in Table I. The specific activity of the antibody was higher than that of the column passage in all cases, and in each case was increased over the original serum.

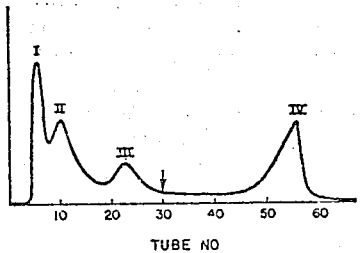

TUBE NO

CHART 2.

Elution pattern of rabbit antilymphocyte sera from the specific immunoadsorbent. The arrow indicates where elution with 0.1 M glycine HCl pH 2.5 began. Peaks I, II and III were pooled as column passage (CP). Peak IV contains the antibody activity (ATAB).

TABLE III

Transformation of rhesus peripheral lymphocytes by anti-thymocyte serum and the two fractions separated by immunadsorbent

|  | Mg IgG | cpm |
|---|---|---|
| ATS | 6 | 32557 |
| ATAB | 6 | 3258 |
| CP | 6 | 202 |

TABLE IV

Recovery of specific activity of goat anti-human lymphocyte antibody isolated from immunoadsorbent conjugate with rhesus lymphocyte stroma

|  | IgG | LA | Cyt | LA/Mg IgG | Cyt/Mg IgG |
|---|---|---|---|---|---|
|  | mg/ml |  |  |  |  |
| Globolin[a] | 12.12 | 500 | 5,000 | 42 | 410 |
| Antibody[b] | 9.72 | 5,000 | 10,000 | 515 | 1,030 |

[a] Goat antiglobulins prepared by ammonium sulfate precipitation.
[b] Eluted with glycine HCl, pH 2.5.

Maximum transformation by the three materials (ATS, ATAB and CP used as mitogens was obtained at a level of 6 mg IgG/culture tube. The maximum level of transformation (cpm-control cpm) is shown in Table III. There is a 10-fold difference in the mitogenic activity between the serum and antibody fraction which is not recovered in the CP fraction. Similar transformation experiments have been repeated several times with other preparations of these fractions and the results have been essentially the same.

Goat anti-human lymphocyte globulin applied to the rhesus stroma immunoadsorbent column was found to bind and elute in the same manner as the anit-rhesus lymphocyte serum. The activity of the eluted antibody is shown in Table IV. Specific activity is calculated based upon both the leukagglutinins/milligram IgG and cytoxicity/milligram IgG. The specific activity based on the leukagglutinin titer increased 10-fold and the specific activity based on cytoxic titer increased greater than twofold.

It is noted in this example that antigenic fragments of lymphocyte stroma were prepared by slow hypotonic lysis of purified rhesus lymphocytes. These fragments conjugated to a modified dextran polymer (Sephadex G-100) constitute an immunoadsorbent that can be used repeatedly for specific purification of antilymphocyte antibody. In the present example rabbit antirhesus lymphocyte isolated from this immunoadsorbent represented 6 to 9% of the total protein or 18 to 26% of the IgG present in the original sera. The specific activity (leukagglutinins/milligrams IgG) of the isolated antibody fraction increased approximately 10-fold over the original sera.

EXAMPLE II

The Immunosuppressive Effect of a Purified Antibody on Graft Rejection and Delayed Hypersensitivity Rhesus monkeys treated with purified rabbit antilymphocyte antibody (isolated and purified by a procedure in accordance with Example I), rabbit antilymphocyte sera (ALS), and normal rabbit sera (NRS) were sensitized with 1 mg p-azophenylarsono-N-acetyl tyrosine (R-Tyr) in complete Freund's adjuvant. Each of the rhesus monkeys which were treated with either NRS or ALS (150 mg IgG/Kg) showed skin homograft survival of 10 and 23 days respectively. Rhesus monkeys treated with the purified antilymphocyte antibody (ALAB), 75 mg IgG/Kg, showed skin homograft survival of at least 32 days.

Additionally, skin tests with R-BSA (50γ) and old tuberculin (1:80) were performed 13 days after sensitization. Test sites were read at 5, 24, and 48 hrs. The control animals (NRS treated) had no reaction at 5 hrs but strongly positive skin reactions to both antigens at 24 and 48 hrs. Animals treated with ATS had negative skin reactions at 5, 24, and 48 hrs. Animals treated with the purified antibody had no reaction at 5 hrs but had positive skin reactions at 24 and 48 hrs to both antigens.

The level of skin reactivity was correlated with in vitro transformation of peripheral lymphocytes from sensitized animals stimulated with R-Tyr and PPD.

The results indicate that immunosuppression of skin homografts with specifically purified antilymphocyte antibody leaves other elements of the cellular immune apparatus intact.

EXAMPLE III
Preparation of Sheep Anti-human Lymphocyte Antibody from a Specific Adsorbent Prepared from Human Lymphocytes Sheep anti-human lymphocyte sera (SAHLS) was prepared in the same manner as described above in Example II for the rhesus system except that sheep were immunized with $62 \times 10^8$ human thymocytes at each immunization time. The human lymphocyte stroma was prepared in a manner similar to that of the rhesus stroma adsorbent and as detailed ante. The antilymphocyte sera was applied and the antibody eluted. The purified antibody (SAHLAB) was tested in vitro by leukoagglutination and cytotoxicity and possessed a level of increased activity substantially as that of the rhesus antibody. The whole sera (SAHTS) and the purified antibody were tested in rhesus monkeys for their ability to extend skin homograft survival. This purified antibody administered at the same level as the anti-rhesus antibody (75 mg IgG/Kg) of Example II extended skin graft survival to 25 days. The results represent a significant extension of survival when as here the material was tested in a different though closely related species.

The same purified sheep anti-human lymphocyte antibody (SAHLAB) has been used in human patients to suppress kidney graft rejection and the results have been satisfactory and non-toxic.

The embodiments of this invention in which an exclusive property or privilege is claimed are defined as follows:

1. A reusable immunoadsorbent for the purification of antibody against lymphocytes which consists of lymphocyte stroma conjugated to a cyanogen bromide activated cross-linked dextran polymer base wherein said dextran is cross-linked with epichlorohydrin.

* * * * *